May 9, 1950      A. WEISSENBACH      2,507,486

SMOKED FOOD PRODUCT AND METHOD OF PREPARING SAME

Filed Dec. 30, 1948

INVENTOR
*Alfred Weissenbach*
BY
*Robert S. Dunham*
ATTORNEY

Patented May 9, 1950

2,507,486

UNITED STATES PATENT OFFICE 2,507,486

SMOKED FOOD PRODUCT AND METHOD OF PREPARING SAME

Alfred Weissenbach, New York, N. Y.

Application December 30, 1948, Serial No. 68,243

4 Claims. (Cl. 99—107)

1

This invention relates to meat products and more particularly to a non-cased, smoked meat product having new and unusual characteristics, and also to procedure for making such product. In an important specific sense, the invention is directed to the production of a novel meat product, made essentially of finely comminuted beef and pork, and having new and pleasing characteristics of flavor, tenderness, and freshness, and likewise general physical properties as more particularly described below, which cooperate to make it distinctly different from any ground and smoked meat article, such as frankfurters, sausages and the like, heretofore available. Chief objects of the invention are thus to provide a new, non-cased meat product of the character stated, having greater palatability and utility and representing a remarkably superior article of food, both in taste and adaptability to use; to provide new and improved methods of treating ground meat of the class described; and to afford a simple, convenient and rapid process for the manufacture of a smoked meat product, avoiding many laborious or costly steps such as hitherto required in making various kinds of smoked meat articles.

While the new product of the invention is, as stated above, entirely different from a frankfurter, the latter probably represents the chief ground and smoked meat product heretofore available, and some brief reference therefore seems appropriate, to prior practices and proposals for making sausage, especially of the type just mentioned.

Frankfurters are most commonly manufactured by a long series of operations that include preparing the comminuted meat mixture or emulsion, stuffing it into individual casings (which are derived from animal intestines), and then subjecting the cased sausages to various heating, smoking and chilling procedures designed to yield the final, cased frankfurter of well-known type. In some instances, so-called skinless frankfurters have been produced, by making the article in more or less the usual way, but in a casing of synthetic material, which is finally stripped off, after the smoking and other treatments have been completed. Certain other proposals for making frankfurters without the use of separate animal casings have been directed to the formation of a crust or skin on the elongated, cylindrical body of meat, to take the place of a separately applied casing.

In one such prior concept it was proposed that the raw, comminuated mix be packed in smooth-

2 walled cylindrical molds having internal dimensions corresponding to a sausage, the pressure-packed material being subjected, while in the mold, to a cooking operation so that a crust or coating is formed on the exterior surface. In another prior method, the comminuted frankfurter mix is similarly first packed, under pressure, in a smooth-walled tubular mold from which it is then extruded, yielding a preliminary article having a smooth, glossy surface, presumably derived by squeezing out from the meat a layer of fat and liquid materials which is smoothed and spread over the external surface of the object by virtue of the described mechanical pressure and treatment. This preliminarily coated article is then subjected to successive steps including surface freezing, a long setting period (up to two days or more) to coagulate the membrane, a variety of heat treatments for the same purpose, and finally a very long smoking and heating operation which effectuates or completes the solidification and toughening of the external membrane. The product is a frankfurter, not skinless but having a casing formed and solidified from material pressed out of the sausage mix itself.

In contrast to the foregoing I have found that a remarkable meat product, wholly unlike frankfurters or similar prepared meats but applicable to all the uses of such articles as well as to many other styles of cooking and serving, may be achieved by a novel and simplified series of operations which depart radically from the prior methods described above. More specifically, I have found that instead of either stuffing the original, semi-fluid emulsion into a casing or treating it so that it promptly forms its own skin or sealing membrane, a new and firm yet flavorful product is achieved by first shaping the soft, more or less fluid mixture (e. g. of beef and pork ingredients) without skin-forming pressure, into a flattened or cake-like configuration which is wholly self-supporting when disposed on a flat surface, and then immediately subjecting the article so shaped, to a relatively brief but thorough smoking operation wherein its entire content is effectively heated to a temperature of, say, 165° to 180° F.

In the smoking step, the flat, self-sustaining cake—having, for instance, a height of not more than one-half inch or so and lateral dimensions of at least several inches—is kept wholly free except for a perforate support beneath it, so that the applied smoke has ready access to substantially the entire surface of the article. Before the smoking, particular care is taken to avoid any pressure, wiping, heating, freezing or like treatment which would in the slightest manner tend to squeeze out or form or set any sort of skin, coating, or other continuous layer on the external surface of the article. The initial shaping operation, which may be accomplished either by hand or by machine, is simply designed to divide the original, finely comminuted, moist mix into portions of convenient quantity which can be deposited directly (to save time and handling) on the flat screen used to hold the articles in the smoking chamber. The shape of the articles is of critical significance for the success of the process, not only from the resulting convenience in use of the finished article, but most especially in effectuating the entire operation for production of a fully coherent but wholly non-cased, smoked meat product having its entire surface free and porous. In other words, by depositing the material in the described flat shape, pressure operations which tend to squeeze out a coagulable coating on the surface are avoided and the article is established in a condition which is self-supporting, e. g. on a simple level surface or the like, and is thus suitable for further processing without need for any retaining skin or coating.

As a result, the articles introduced to the smoke chamber have a high degree of porosity on the surface and throughout their interior. The smoke and heat rapidly penetrate the entire body of the article, reaching all the particles of meat and giving all of them the peculiarly desirable smoked flavor to an extent previously unobtainable in a frankfurter, where a natural or synthetic casing or a skin formed on the meat material itself has tended to seal the body and block the ingress of smoke. Moreover, with the specially shaped articles of the present invention the smoking and heating operation can be completed and the improved flavor and other characteristics fully attained in a much shorter time than the smoking period ordinarily necessary for frankfurters, e. g. in about one-half hour as contrasted with the customary two hours or more usually taken for the latter product. This fact, i. e. the shorter smoking time, not only represents a great advantage in manufacturing but also demonstrates the thoroughness of heat and smoke penetration which the present process permits.

While it might be supported that described method would simply yield a loose and delicate aggregation of meat particles, I have found that the flattened, porous-surfaced and wholly non-cased, cake-like articles discharged from the smoke room have a remarkably unexpected firmness, coherence and general strength of composition, permitting them to be handled and used almost like solid pieces of meat. They do not break apart easily either as originally produced or in the course of subsequent packaging, transportation, cooking and serving; for example, they can be successfully broiled over open heat by impaling and turning them on a spit, i. e. with the shaft of the spit stuck through the center of each along its short dimension, without danger of breaking off. It thus appears that the thorough penetration of heat and smoke in the smoking step of my process effectuates a special cohesion of the meat particles throughout the entire body, including its whole interior, so as to yield an article which is firm yet amply tender and which retains all of the natural juces and flavor of the meat while being held securely together by uniform cohesion rather than by any outer casing or skin.

By way of illustrative example, the drawing shows certain features of two embodiments of the invention, to be further described below in connection with specific examples of its practice.

Referring to the drawings.

Figure 1:
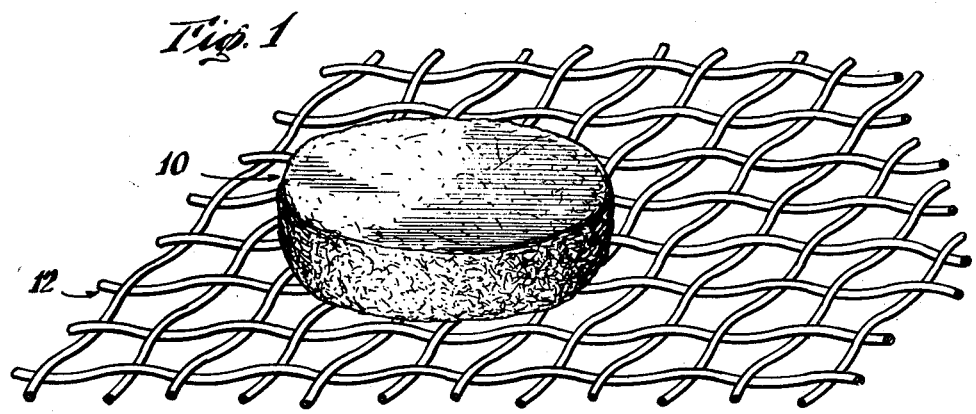
Fig. 1 is a view of one shape of a cake-like body of comminuted meat, resting on a support, for processing in the described manner.

In carrying out the invention in a manner presently preferred, there is first prepared a comminuted meat mixture of the desired composition and characteristics. For most requirements, the meat composition should consist of beef and pork, each in substantial proportion and each preferably including parts of both lean and fat, the pork being, for instance half lean and half fat and the beef of generally similar constitution. Particularly satisfactory results have been obtained by using a mixture of 60% beef and 40% pork (by weight), the pork being composed of lean meat and fat in approximately equal proportions. Where at least a substantial part of the pork (say 25% or more but most preferably about one-half), is fat, the beef may, if desired, be all or nearly all lean meat; nevertheless, the beef may conveniently be derived from the less expensive cuts, or from trimmings, and thus involve substantial proportions of both lean and fat, with apparent benefit to the ultimate characteristics of the product. According to present experience, the cohesion, firmness, juiciness and distinctive flavor of the product are remarkably promoted not only by employing both lean and fat constituents as just stated but also by using, for the beef ingredient, only meat which comes from male animals.

Although the process permits effective use, in many cases, of a relatively coarse grinding of the meat ingredients (indeed with some special advantage of texture or the like in the ultimate product), a convenient method of preparing the raw mixture is simply to follow the general practice of making a so-called frankfurter emulsion of good quality, preferably using the proportions and kinds of meat which are specified hereinabove. Thus the meat is finely comminuted and thoroughly mixed, by using equipment of the customary type, includng if desired a so-called silent cutter, so as to yield a moist, semi-fluid and thoroughly uniform mixture of fine particles or pieces of meat. Salt and other flavoring ingredients, such as spices and the like, may be included to the extent desired, e. g. in the usual proportions which are of very minor amount relative to the meat constituents. In initially assembling the ingredients, some water may be included, and in fact the customary practice of incorporating the water as ice may be employed, such ice serving its usual purpose of preventing overheating of the meat during the grinding or cutting operation. Thus the complete mixture may be said to consist essentially of finely comminuted meat, and to include other ingredients of appropriate sort, including moisture and the usual seasoning.

When so made, i. e. in accordance with the practice of the frankfurter industry, the final, raw mix, is of an extremely fine-grained composition, sometimes aptly characterized as an emulsion, and is of a soft and semi-fluid character. Its fluidity is such, for example, that if shaped gently by hand, or otherwise, into a cylindrical or sausage-like configuration, the resulting body is not self-sustaining, but will flow down or break apart into a flattened shape or at least will tend to sag or separate when carried about on its support. While in some cases, stiffer (and as indicated above, substantially coarser) mixes may be made, the fine-textured, soft and semi-fluid frankfurter-type mixture is believed to contribute peculiarly to the desirable juiciness and tenderness of the ultimate product.

Figure 2:
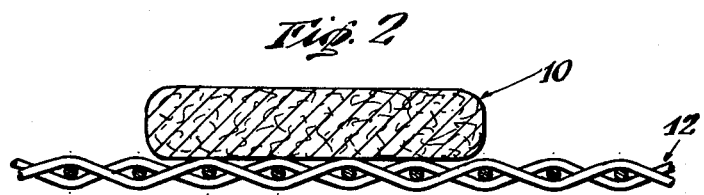
Fig. 2 is a vertical section of the article and support shown in Fig. 1.

The prepared raw mix is then divided and shaped, i. e. to provide separate portions of convenient amount and of the specific, flattened configuration with which the present invention is concerned. Having in mind the usual requirements of the trade for individual servings of meat products, the separate portions may be of any desired amount, preferably within the range of 2 to 6 ounces to which the present process is peculiarly suited. The shaping operation thus provides a flat cake, for example as shown at 10 in Figs. 1 and 2, deposited on a suitable perforate support such as the screen 12. In Figs. 1 and 2 the cake is round and has a vertical dimension, i. e. a height, which is small relative to its lateral dimensions. It has been found that the height of the cake should be substantially less than one inch, notably three-quarters of an inch or less and also preferably somewhat more than one-quarter of an inch. The lateral dimensions may be from two to four inches or so, thus representing at least about twice, and preferably several times, the vertical dimension. Under such circumstances, and even though the raw mix may be relatively fluid (i. e. semi-fluid), it is found to be self-sustaining, in shape, on the flat foraminous support 12.

Figure 3:
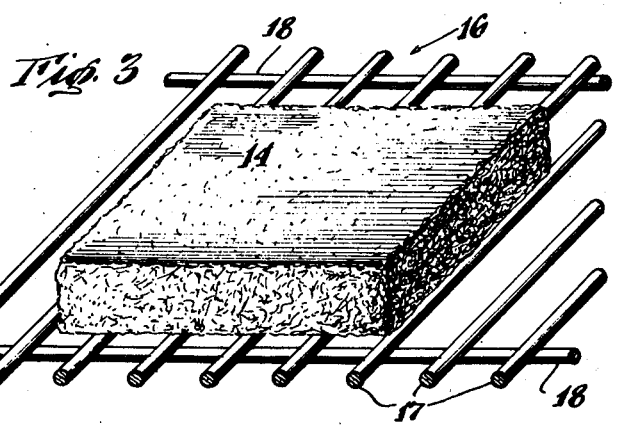
Figs. 3 and 4 are views corresponding to Figs. 1 and 2 respectively, but showing an article of somewhat different shape.
Figure 4:
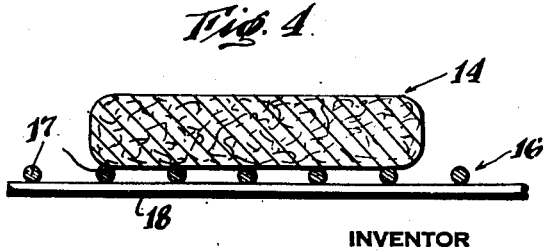

While in some respects the circular cake 10 of Fig. 1 is of critical advantage as for structural strength, Figs. 3 and 4 show an alternative cake 14 having a rectangular or square configuration but the same relationship between its vertical and lateral dimensions and the same characteristic of self-supporting shape. In Figs. 3 and 4 the cake is shown disposed on another form of perforate support, e. g. a grill or the like 16 composed of a multiplicity of spaced parallel rods or wires 17 carried by widely spaced cross-rods 18. These and other types of foraminous supports may be interchangeably used, including trays or the like made of sheet metal having a multiplicity of closely spaced holes, the chief criterion being as great an amount of opening as possible, consonant with support of the shaped, raw piece 10 or 14. For instance, the spacing between the wires of the screen 12 or the grill 16 may be about equal to the height of the articles 10 or 14, i. e. ½ to ⅝ inch, or even somewhat greater in some cases.

As indicated above, the actual shaping operation can be performed by hand, or automatically by suitable machinery for separating and depositing cake-like bodies. Preferably the shaping surfaces are wet with water (or edible oil), which facilitates handling and keeps the cakes from sticking. It is particularly important that substantial pressure be avoided, and likewise wiping or squeezing effects such as might be occasioned by extruding a mass of the material under pressure and along or within smooth surfaces. As far as possible, the chief criterion is to avoid squeezing out of the meat, any film or coating that might extend continuously over much or all of its outer surface and constitute, even in a partial sense, a seal or seal-forming layer which would hinder the penetration of smoke and heat.

Although when great care has been taken to avoid any such preliminary coating the shaped bodies can sometimes be held or stored for a little while, they are preferably just brought to room temperature for 10 or 15 minutes, and subjected at once to the smoking operation. More particularly, all intermediate mechanical contact, pressure, and manipulation, and all treatments with heat or warm air or at freezing temperatures are to be avoided before the smoking, at least to the extent that such treatments might tend to promote the formation of a sealing film on the surface.

Carried on the perforate supports, the shaped articles are thus introduced to the smoking chamber, and subjected to smoke of any suitable character, for example as commonly now used for the smoking treatment (although at best only partially effective) in the case of first quality frankfurters. Because the surface of the article retains a high porosity and because the interior of the body has not been subjected to any substantial pressure or compacting such as would impair its very minutely but essentially porous character, the smoking is completed in a remarkably short time. During this operation, the article is simultaneously heated, but temperatures above about 180° F. need not ordinarily be reached, and indeed seem undesirable for optimum characteristics of flavor and freshness in the final product. In general, it appears best to confine the smoking step to less than one hour, about one-half hour now appearing ample for articles of the general size and shape described above. The temperature, as stated, can be kept at a suitable point in the range of 150° to 200° F., but most preferably in a range of 165° to 180° F., and in any case, sufficient to heat the portion thoroughly and for a considerable length of time, such temperature within the article itself being reached by at least the latter half of the smoking period. The smoke penetrates effectively throughout the interior of each portion 10 or 14, imparting a fully smoked character to all of the constituent meat, and at least partially cooking it.

Upon completion of the smoking step and after, say, 5 minutes steam or other cooking at 150° F. for sterilization, the articles are, for many purposes, ready to be distributed and used, e. g. providing they are kept under ordinary refrigeration. Indeed it has been found that the product may be so kept—retaining all of its flavor and freshness and suffering no deterioration whatever—for much longer periods of time than the limit of about 10 days beyond which it is usually unsafe to keep frankfurters. It appears that the much more thorough smoking treatment achieved in my process has a remarkable preservative effect in the product, so that even less refrigeration is required than for fresh meat; nor does the product acquire the surface slime or the like which is often found on frankfurters that are a few days old.

Figure 5:
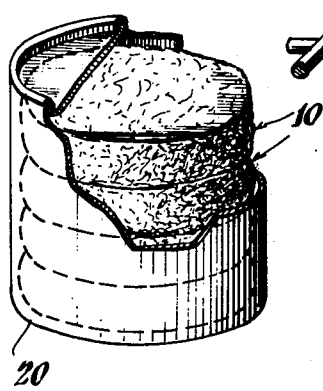
Fig. 5 is a view of products embodying the inventions, packaged in a can, the latter being partly broken away for clarity of illustration.

A further feature of the invention, however, involves packaging the articles in suitable cans. For instance as shown in Fig. 5, the flat, round articles 10 may be stacked, flatwise against each other, so that a convenient number of them fill a cylindrical can 20 of appropriate dimensions.

A small quantity of water (not shown) may also be introduced into the can, it being found unnecessary, in most instances, to use any special brine or the like. The cans are then sealed, in suitable absence of air, and put in a cooking chamber or retort for final processing to insure preservation of the contents. Again, it is found that the treatment time may be much shorter than heretofore employed for canning articles such as frankfurters, and the temperature of cooking may also be very considerably less, yet at the same time the ultimate canned products retain their superior and distinctive flavor and other qualities, while being fully preserved against deterioration.

More specifically, it has been found sufficient (in most cases) to heat the sealed cans 20 in a cooking retort for about 45 minutes at a temperature of 230° to 235° F., in contrast to the customary practice, in canning frankfurters and the like, wherein temperatures of 265° to 280° F. or so must be employed for at least 2 hours or more. According to present understanding the thorough permeability of the product, including its free and porous surface and its internal porosity, as well as the remarkable thoroughness of smoking and partial cooking achieved in the preceding stage, permit much more complete and effective penetration of the heat through the can and into the furthest interior of the individual articles 10. Thus there is no need for the heat to travel through such considerable intermediate spaces of air, steam or liquid to reach the articles, or to penetrate casings, skins or coatings, as is the situation when a cluster of frankfurters is packaged in a can and processed by a cooking operation. More generally, the cooking temperature for the new product in cans may be defined as from 225° to 245° F., and for a period of not more than forty-five minutes—say one hours at the most—to provide a thoroughly sterilized and fully cooked product. By reason, moreover, of the shorter cooking time and lower temperature, much less of the natural juices and flavoring are withdrawn from the meat bodies into the surrounding liquid and their subsequent flavor and freshness are very much better than that attainable in the case of canned frankfurters.

So packaged, the products of the present invention are effectively preserved, so that they can be kept indefinitely, and distributed and stored like any other canned goods.

As will now be seen, the entire procedure is extremely simple and expeditious. Numerous steps, such as stuffing casings, tying each link (by expensive machinery), preliminary setting treatments, final chilling after smoking (necessary in the case of frankfurters because they cannot be handled at the high temperatures reached) are entirely avoided, including many and potentially unsanitary operations (such as the costly step of stripping of casings in the previous manufacture of skinless frankfurters) wherein the raw, partly finished or completed links are manipulated, transported, packed, hung, or arranged by hand. Opportunity for infection by or development of fungus and mold-producing organisms is minimized. Furthermore, the whole process is much shorter in time and requires much less equipment and plant area, yet achieves a new and remarkably improved product, as explained hereinabove.

There is no tough or otherwise unpalatable casing or skin on the outer surface of the new product, and it has a delectable flavor and freshness of a wholly different order from that of frankfurters, including a natural meat savor which appears to be unobtainable in the latter; yet the articles may be cooked or heated, and served (e. g. steamed, broiled, fried, boiled or roasted) not only in the same way as frankfurters, but also like ordinary unprocessed meat. By virtue of their flattened shape, essential to the attainment of the other purposes of the invention, they are peculiarly convenient for use in sandwiches, rolls and the like.

Although cakes having a round or other shape with substantial equality of lateral dimensions are distinctly and peculiarly suitable (e. g., in avoiding a disproportionately large surface area) for the product of the invention, it will be appreciated that the method is applicable to other shapes, including elongated and like configurations which have the above-specified, essentially flattened structure. The procedure can also be usefully followed with other meat mixtures than the specific beef and pork combinations described, although (as indicated) a specific feature of the invention relates to the employment, for the stated product, of mixtures of beef and pork, containing at least 25% of each (and preferably at least 40%) and containing a substantial proportion of fat, of which at least a part is preferably pork fat. Alternatively, in some cases, the process can be applied to so-called all-beef products, wherein the meat constituent is entirely beef, i. e. both lean meat and fat. Veal can also be used in place of all or part of the beef, i. e. in combination with pork or as an all-veal or all veal-and-beef product. Where permitted and acceptable, very minor quantities of a filler ingredient, such as a cereal material may sometimes be included so long as the product still consists essentially of meat; but the special advantages of the invention appear to be realized in the most distinct manner, only when the mixture consists entirely of beef and pork as herein explained.

It is to be understood that the invention is not limited to the specific compositions, forms and procedures herein described and shown, but may be carried out in other ways without departure from its spirit.

This application is a continuation-in-part of my co-pending application Serial No. 605,842, filed July 18, 1945, for Smoked food product and method of preparing same, now abandoned.

I claim:

1. A method of making a smoked meat product from ingredients consisting essentially of meat, comprising comminuting the meat and assembling the ingredients in comminuted form to constitute a soft, semi-fluid mass, dividing said mass into portions each having a weight of not more than about six ounces and shaping each portion in a flattened configuration having a height which is small relative to its lateral dimensions, while preventing appreciable pressure sufficient to provide a seal-forming surface on the shaped portion, said shaped portion being adapted by reason of its aforesaid dimensional characteristics, to be self-sustaining in shape when disposed flatwise for support underneath at localities in a common plane, supporting each portion beneath its under surface at a multiplicity of localities lying in a common plane and distributed throughout said under surface with spaces of said under surface exposed intermediate said localities, and while so supporting the same and without intermediate treatment of the portions, subjecting each portion immediately to smoking treatment in the presence of heat, to smoke the portion throughout and to cook it at least partially, said smoking treatment having a duration of less than one hour and including thoroughly heating the portion to a temperature in a range of 150° to 200° F., each portion being maintained as a porous body, having a porous character throughout whereby the smoke penetrates deeply and throughout said portion, said heat and smoke treatment converting the portion to a coherent, smoked meat product having substantially all of its surface free and porous.

2. A method of making a smoked meat product from ingredients consisting essentially of beef and pork, comprising comminuting the beef and pork and assembling the ingredients in comminuted form to constitute a soft mass, said comminution being effected to a fineness characteristic of emulsion-type frankfurter mix, dividing said mass into portions and shaping each portion in a flattened, self-sustaining configuration having a height which is small relative to its lateral dimensions, while preventing formation of a seal-forming coating on said shaped portion, said shaped portion being adapted to be self-sustaining when disposed flatwise for support underneath at localities in a common plane, supporting each portion beneath its under surface at a multiplicity of localities lying in a common plane and distributed throughout said under surface with spaces of said under surface exposed intermediate said localities, and while so supporting the same and without intermediate treatment adapted to provide a coating on the surface of the portion, subjecting each portion to smoking treatment in the presence of heat, to smoke the portion throughout and to cook it at least partially, each portion being maintained with substantially all of its surface free after the shaping step, and said heat and smoke treatment converting the portion to a coherent, smoked meat product having substantially all of its surface free and porous.

3. A non-cased meat product consisting of a firm, coherent, unified, thoroughly smoked, and at least partially cooked body having a self-sustaining shape in a flattened configuration with a height which is small relative to its lateral dimensions, said height being at least about one-fourth of an inch and less than one inch, said body being a fine-textured meat mass and consisting essentially of finely comminuted meat selected from the class consisting of beef, veal and pork, at least 25% of said body being of the class consisting of beef and veal, all of said meat having the fineness of comminution characteristic of frankfurter emulsion, the particles of said finely comminuted meat being effectively coherent throughout the body and thereby holding the body firmly together in all parts, said body having all of its portions effectively smoked and at least partially cooked, substantially all of the surface of the body being free and porous, said body being firm, porous and uncompressed throughout and having the uncoated surface and internally uncompacted structure characteristic of a comminuted meat body shaped and brought to and through a smoking treatment without pressure and without preliminary heating, and without chilling the shaped body, and said body having substantially uniform moistness and consistency throughout.

4. A non-cased meat product consisting of a firm, coherent, unified, thoroughly smoked, and at least partially cooked body having a self-sustaining shape in a flattened configuration with a height which is small relative to its lateral dimensions, said height being from about one-fourth to three-fourths of an inch, said body consisting essentially of comminuted beef and pork, at least 40% of said body being beef, all of said meat having the fineness of comminution characteristic of frankfurter emulsion, the particles of said comminuted meat being effectively coherent throughout the body and thereby holding the body firmly together in all parts, said body having all of its portions effectively smoked and at least partially cooked, substantially all of the surface of the body being free and porous, said body being firm, porous and uncompressed throughout and having the uncoated surface and internally uncompacted structure characteristic of a comminuted meat body shaped and brought to and through a smoking treatment without pressure and without preliminary heating, and without chilling the shaped body, and said body having substantially uniform moistness and consistency throughout.

ALFRED WEISSENBACH.

REFERENCES CITED

The following references are of record in the file of this patent:

UNITED STATES PATENTS

| Number | Name | Date |
| --- | --- | --- |
| 1,009,953 | Boyle | Nov. 28, 1911 |
| 1,964,009 | Vogt | June 26, 1934 |
| 1,964,011 | Vogt | June 26, 1934 |
| 2,043,132 | Vogt | June 2, 1936 |

FOREIGN PATENTS

| Number | Country | Date |
| --- | --- | --- |
| 476,469 | Great Britain | Dec. 9, 1937 |